Figure 1:
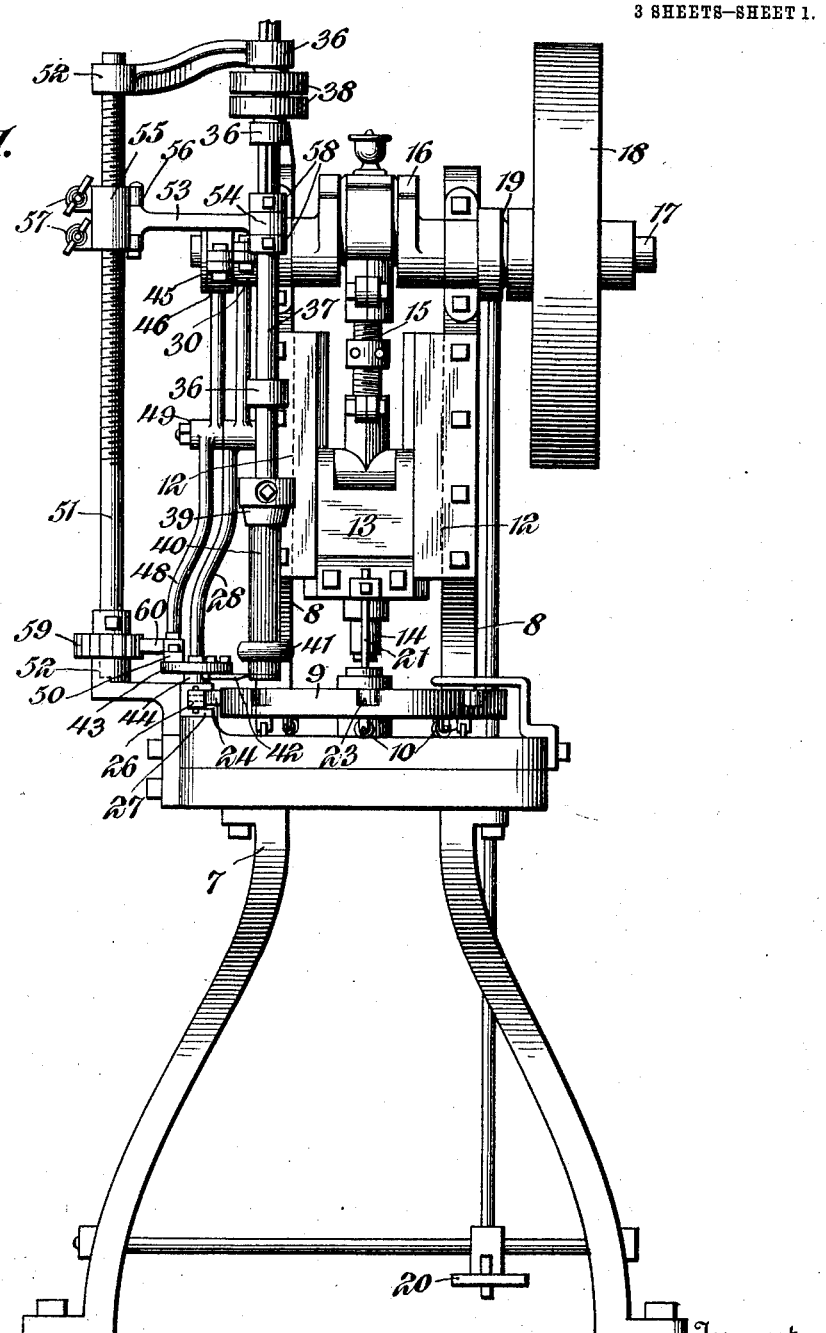

W. J. PHELPS.
MACHINE FOR CUTTING SOLDER RINGS AND APPLYING THE SAME TO THE EDGES OF CAN CAPS.
APPLICATION FILED JAN. 23, 1908.

1,005,298.

Patented Oct. 10, 1911.

3 SHEETS—SHEET 1.

Witnesses
Howard D. Orr

Walter J. Phelps, Inventor,
By E. G. Siggers
Attorney

W. J. PHELPS.
MACHINE FOR CUTTING SOLDER RINGS AND APPLYING THE SAME TO THE EDGES OF CAN CAPS.
APPLICATION FILED JAN. 23, 1908.
1,005,298.
Patented Oct. 10, 1911.
3 SHEETS—SHEET 3.
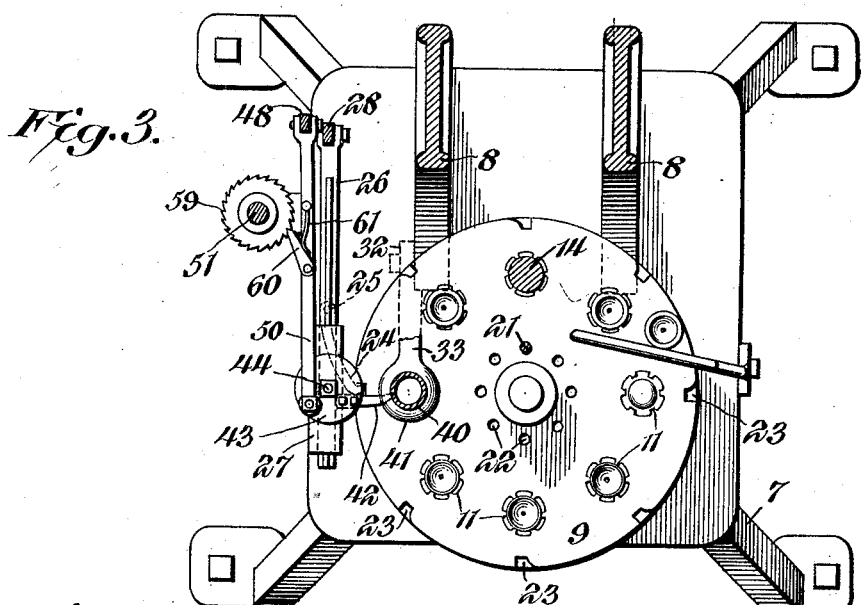
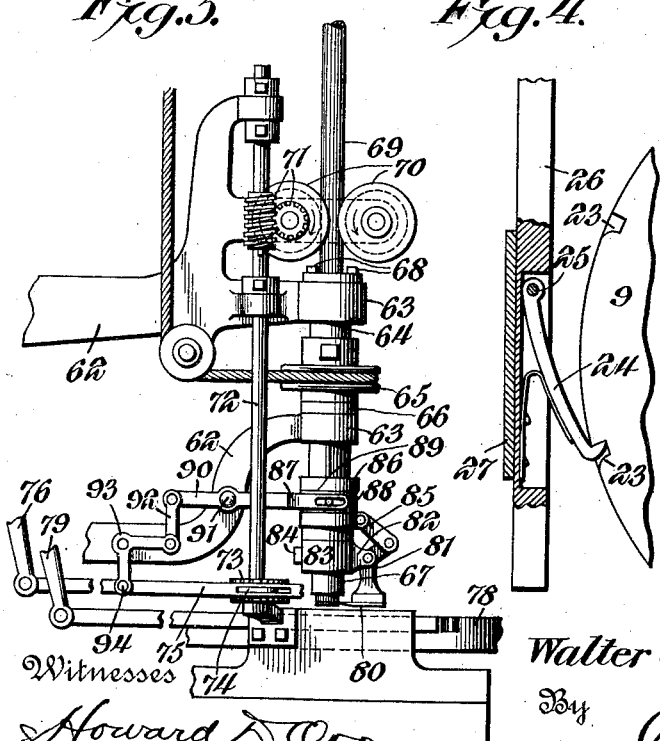
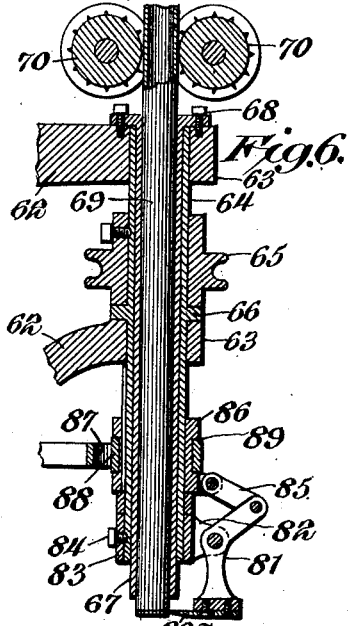
Walter J. Phelps, Inventor,

UNITED STATES PATENT OFFICE.

WALTER J. PHELPS, OF BALTIMORE, MARYLAND.

MACHINE FOR CUTTING SOLDER RINGS AND APPLYING THE SAME TO THE EDGES OF CAN-CAPS.

1,005,298.  Specification of Letters Patent.  Patented Oct. 10, 1911.

Application filed January 23, 1908. Serial No. 412,312.

*To all whom it may concern:*

Be it known that I, WALTER J. PHELPS, a citizen of the United States, residing at Baltimore, in the State of Maryland, have invented a new and useful Machine for Cutting Solder Rings and Applying the Same to the Edges of Can-Caps, of which the following is a specification.

In the production of can caps having edges bound with solder rings, the most practical method employed of which I am aware is that in which the ring is stamped from a flat sheet, and is fed into the die mechanism, which applies the ring to the rim of the cap. With this method, it will be evident that where the rings are cut from sheets, there is great waste of material, which waste has to be remelted and rerolled, besides the cost and uncertainty of feeding the rings to the applying mechanism.

One of the primary objects of the present invention is to provide novel, simple and effective mechanism, whereby the rings are cut from a stock of material without any waste and the cutting mechanism constitutes in effect feeding means that delivers the cut rings in proper position to be acted upon by the applying die mechanism.

Two embodiments of the invention are illustrated in the accompanying drawings, but it is to be understood that the invention is not necessarily limited to these two forms alone.

Figure 2:
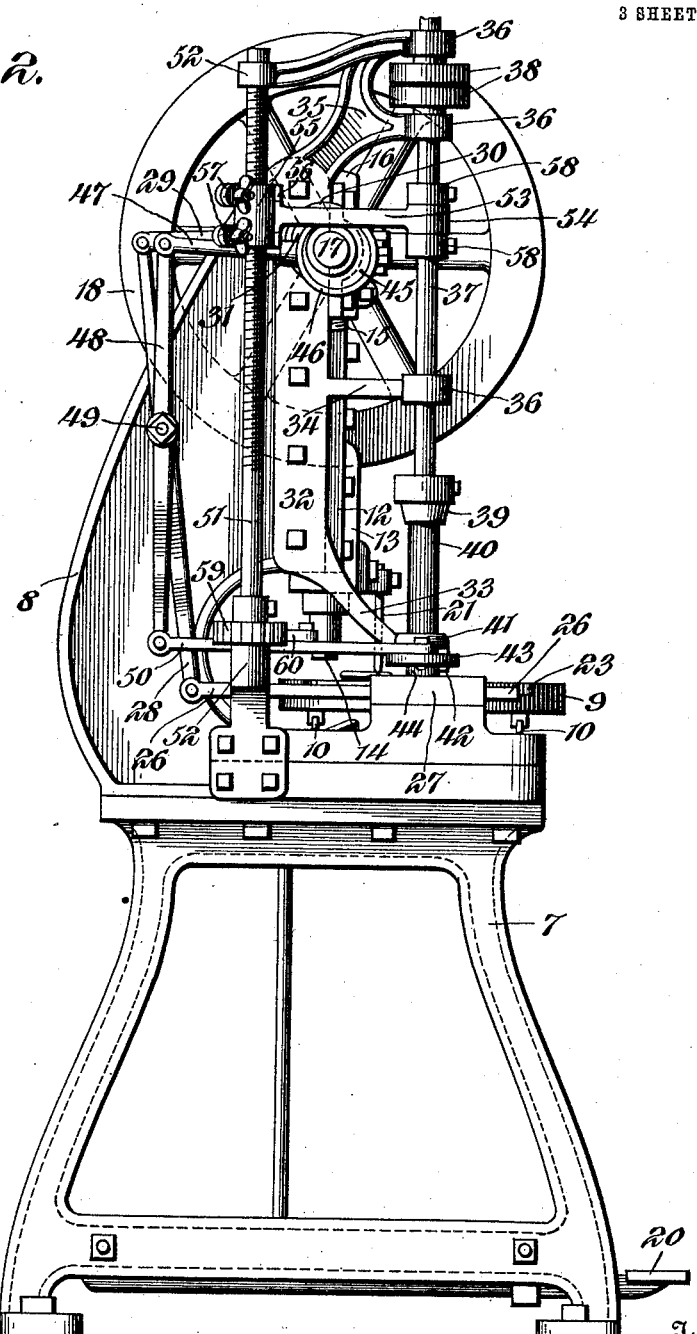

In the drawings:—Figure 1 is a front elevation of one form of construction. Fig. 2 is a side elevation of the same. Fig. 3 is a horizontal sectional view. Fig. 4 is a detail horizontal sectional view on an enlarged scale, illustrating the mechanism for effecting the rotation of the table. Fig. 5 is a side elevation of a slightly modified form of construction. Fig. 6 is a vertical longitudinal sectional view through the same.

Similar reference numerals designate corresponding parts in all the figures of the drawings.

Referring first to the embodiment disclosed in Figs. 1–4 inclusive, a suitable supporting frame 7 is employed carrying an upstanding bracket frame 8. A rotatable table 9 is journaled on the frame, being supported by suitable rollers 10 and is provided in its upper face with a series of recessed seats or female dies 11. The bracket of the frame 8 have guideways 12 secured to their inner sides, and a head block 13 that reciprocates in said guideways, is provided with die mechanism 14, and is movable into and out of the seats or female dies
11. The die mechanism may be of any well known character for applying solder rings to the edges of can caps. Preferably, however, it comprises mechanism constituting the subject-matter of a separate invention, which applies the ring by a single operation. The head 13 has a pitman connection 15 with the crank 16 of a driving shaft 17. The shaft is preferably continuously operated, being provided with a driving pulley 18, and may for convenience, have suitable clutch mechanism 19 operated by a treadle 20 so that the machine can be stopped and started whenever desired. In order to hold the table against rotation during the applying operation, the cross head is preferably provided with a locking pin 21 that operates and moves into and out of a series of sockets 22 formed in the table 9.

Means are provided for effecting a step by step rotation of the table, and to this end the edge of the table is provided with a series of ratchet shoulders, in which engages a dog 24 pivoted, as shown at 25 on a reciprocatory link 26. This link operates in a guideway 27, and is connected at its rear end to the lower end of a lever 28. The lever is fulcrumed on one of the brackets 8, and has a pitman connection 29 at its upper end with a strap 30, which strap surrounds an eccentric 31 carried by the driving shaft 17. It will of course be understood that the eccentric is so disposed to the crank 16 that the table 9 will be moved when the die mechanism 14 is elevated.

The means for producing and feeding the rings of solder to the mechanism is as follows: One of the brackets 8 has bolted thereto, a frame piece 32 provided with a series of arms 33, 34 and 35. The arms 34 and 35 have suitable journal boxes 36 in which is mounted a rotatable and longitudinally movable shaft 37 that is vertically disposed. Between the upper boxes 36 and mounted on the shaft are loose and tight pulleys 38, the tight pulley being feathered so as to permit the longitudinal movement of the shaft, as will be evident. The lower end of this shaft carries a suitable universal chuck 39 in which is adapted to be secured the upper end of a tube 40 composed of solder. This tube has its lower end guided by a collar 41 carried by the end of the lower arm 33, and said tube has its lower end located directly over and directly adjacent to the path of movement of the female dies or recessed sockets 11.

Movable into and out of coaction with the lower end of the solder tube 40 is a knife blade 42 that is fixed to a supporting disk 43 journaled as shown at 44, at one side of the table. The movement of the knife into and out of coaction with the tube is controlled by an eccentric 45 carried by the driving shaft 17 and surrounded by a strap 46 to which is connected a pitman 47. This pitman is pivoted to the upper end of a lever 48 fulcrumed between its ends, as shown at 49 and having a link 50 pivoted to its lower end, the link being also pivoted to the supporting disk 43. The longitudinal movement of the shaft 37 is controlled by means of a vertical screw shaft 51 journaled at its ends, as shown at 52 and located at one side of and parallel to the shaft 37. An arm 53, having a collar 54 in which the shaft 37 is journaled, has a split nut 55 at one end that is engaged by the screw of the shaft 51, the sections of the nut being pivoted together, as shown at 56, and having suitable connections 57 to hold them against separation. The collar 54 is located between a pair of collars 58, secured to the shaft 37. The lower end of the shaft 51 is provided with a ratchet wheel 59 and a dog 60, pivotally mounted on the link 50, coöperates with the ratchet wheel 59 and is yieldingly urged into engagement with the same by a spring 61.

The operation of this structure is substantially as follows: A tube of solder 40 is secured in the chuck 39, the shaft 37 having been first raised to its highest position by opening the nut 55 and reëngaging it with the upper portion of the screw shaft 51. The parts are so arranged that when the die mechanism 14 is in proper position to enter one of the female dies or sockets 11, another of said female dies or sockets is located directly beneath the tube, the shaft 37 and consequently the tube being continuously rotated from any suitable source of power. The knife 42 is engaged with the lower end thereof, and a thin endless ring of solder is sliced or severed from said lower end and drops into the female die or socket. As the die mechanism 14 disengages from the table, the dog 24 operates on said table to give the table a turn, in order that the succeeding female dies or sockets will be brought respectively beneath the die mechanism and the solder tube. During this operation, the knife blade 42 is carried out of coaction with the tube, and while out of coaction, the screw shaft 51 is rotated sufficiently to move the shaft 37 and consequently the tube downwardly the thickness of the next ring to be cut. The operation is then repeated. In the present construction, the caps to which the rings of solder are to be applied, are placed in the female dies or sockets prior to the feeding of the rings, but it will be evident that in those types of machines where the rings are fed in first, the same operation may be performed. The detail operation of the cutting and feeding mechanism is substantially as follows. It will be evident that as long as the knife blade 42 is in engagement with the tube, no feed of the tube can take place, and the operation of the knife blade in connection with the feeding means may be divided into four divisions. When the knife blade first strikes the outer face of the tube, the longitudinal movement of said tube must be over, and the knife blade moves inwardly to sever a ring. It then moves outwardly, and until it reaches the surface, no feeding movement can take place. This is the second division. A continued movement of the knife blade carries it away from the tube, and this marks the third division. During this division of movement, the dog 60 engages the ratchet wheel 59 to turn the same, and upon the return or fourth division of movement, namely that required to carry the knife to a position to engage the tube, the feed must also be stopped for the dog 60 is then moving in an inactive direction. The feeding operation therefore takes place only during one-fourth of the movement of the knife, and this movement is so arranged that it will feed the tube downwardly about one-fiftieth of an inch. Consequently the mechanism is so arranged that rings of substantially that thickness are produced. Of course any thickness may be formed, as desired, but the above have proven entirely satisfactory for soldering purposes. By reason of the particular form of mechanical connections for actuating the knife, the latter is given a gradual, constant and unyielding movement through the tube of solder.

It will be evident therefore that very simple mechanism is provided producing rings of solder without waste, and this producing mechanism constitutes means for feeding the rings directly to the applying mechanism. Moreover the rings so produced are accurately formed, and require no handling, and indeed could not well be handled without getting them out of shape. In this connection, it is desired to lay emphasis on the fact that the relative rotation between the tube and blade must be at a high speed and therefore the tube is preferably driven independently of the press. Furthermore the knife which does the severing must have its upper face horizontal, the under face being downwardly tapered from the edge for the purpose of strength, and said knife gives a shearing cut as distinguished from the compressing cut produced by the action of a knife and a support upon which the tube is located. In explanation of the reason for the peculiar shape of the knife as defined, it may be stated that in severing or slicing the rings of solder, it will be evident that the metal above the knife, or in other words, the metal at the end of the tube cannot be crowded or compressed, as it will make the succeeding ring defective or ruin it altogether, and in fact if crowded enough, will prevent a succeeding cut being made. The upper face of the knife therefore, or in other words, that face which is opposed to the end of the tube must, in the form of construction shown, be horizontal as above described. In other words, said face in rear of the cutting edge must not be closer to the end of the tube than the path of movement of the cutting edge. Or looked at in a different light, it may be stated that the body of the knife in rear of the cutting edge must not be nearer the end of the tube than the path of movement of said cutting edge. As a result, the knife cuts through the tube without compressing the metal of the tube above it, and the ring that is being sliced is so thin, that instead of the metal in it being compressed or crowded the ring is bent or dished by the thickened downwardly inclined portion of the knife against which said ring bears. A very important feature therefore of the present invention is the shape of the knife and also the high relative speed between the tube and shearing knife that operates on the end of the tube that is free and unsupported. This high speed action on the unsupported portion of the tube is absolutely essential to the successful operation.

It will be evident that with the above described mechanism, only comparatively short tubes can be employed, but in Figs. 5 and 6, there is illustrated a modification of the mechanism in which long tubes may be utilized. In the form shown, a pair of bracket arms 62 are employed having journal boxes 63 and journaled in said boxes is a sleeve 64, to which is connected a driving pulley 65. The sleeve has a suitable bearing 66 on the lower bracket. Within this sleeve is located a stationary tubular guide 67 fastened to the upper bracket, as shown at 68, and constituting a guide way through which the tube of solder 69 is passed. The downward feed of the solder is effected by one or more of a set of opposite rollers 70 geared by worm gearing 71 to a vertical shaft 72. The shaft 72 has at its lower end a ratchet wheel 73 operated on by a dog 74 that is carried by a reciprocatory link 75. The link is pivotally connected to an operating lever 76 actuated in exactly the same manner as the lever 47 of the first described embodiment. The rotary table is shown at 78, and is operated by a lever 79 as in the first form of construction. A knife blade 80 that severs the rings from the lower end of the tube 69, is secured to the lower end of a bell crank lever 81 fulcrumed between its ends on ears 82 that are carried by a collar 83 fastened to the rotating sleeve 64 by a set screw 84. The bell crank has a link connection 85 at its upper end with a vertically sliding collar 86 mounted on and rotatable with the sleeve 64. A yoke 87 has a pin and slot connection with a strap 88 that is located in a groove 89 in the collar 86, and this yoke constitutes one end of a lever 90 fulcrumed between its ends, as shown at 91 on the lower bracket arm 62. The rear end of the lever 90 has a link connection 92 with one arm of a bell crank 93, the other arm being pivoted as shown at 94 to the link 75. In the first described embodiment of the invention, the tube is rotated and the knife is held against rotation. In this last form of the invention, the tube is held against rotation, and the knife is rotated. The operation of the parts, however, is substantially the same. When the lever 76 moves in one direction, the dog 74 moves inactively over the wheel 73, but during this movement of the lever, through the various connections 90–94, the collar 86 is caused to move downwardly, which swings the knife 80 inwardly, causing it to sever a ring from the tube 69. Upon the opposite movement of the lever 76, and after the knife 80 is disengaged from the tube, the dog 74 will act on the ratchet wheel 73, causing the worm shaft 72 to be rotated, and effecting a downward feed of the tube 69. The parts coöperate in exactly the same manner with the applying mechanism as with the first described embodiment, and it will be evident therefore that this last mechanism has all the advantages of the first, with the additional feature that a long tube may be utilized which will eliminate the necessity of oft repeated resetting of the mechanism as is necessary with the first described construction, particularly when run at a high rate of speed.

There are two other factors of vital importance in the production of perfect solder rings. One is that the knife and the solder tube holder shall be relatively rigidly connected together so that they shall not have independent vibratory movement longitudinally of the solder tube. The other factor is that the knives shall move inward into and out of engagement with the solder tube through the same path of travel. The first factor above referred to is secured by rigidly connecting the knife supporting and actuating mechanism, as far as any longitudinal movement goes, in rigid engagement with the same frame that supports the solder tube holding devices. Thus the solder tube holding devices and the knife will vibrate together so that the longitudinal distance between the two is always the same no matter how much vibration they may be subjected to. Thus the vibration of these two elements will coincide and a proper relation will be always kept between the knife and the end of the solder tube. If it were not for this rigid relation the rings would be wavy when cut and would not be of uniform thickness. One ring would be fairly thick, the next relatively thin, or one portion of the ring would be thick and another portion thin. As a consequence, the machine would not cut suitable solder rings for application to can caps.

The necessity of having the cutting knife move inward and outward through the same path of travel is due to the fact that as little movement of the knife is desired as possible so as to minimize the loss of time due to the movement of the knife inward and outward while the tube is longitudinally stationary. My construction provides for a total movement of the knife equal to twice the thickness of the solder tube. The area of movement would be very much increased if the knife were carried entirely across the tube in one direction from its entering point to its exit point. This not only takes a greater amount of time, but it gives an increased contact with the solder, thus tending to tear the solder ring.

From the foregoing, it is thought that the construction, operation, and many advantages of the herein described invention will be apparent to those skilled in the art, without further description, and it will be understood that various changes in the size, shape, proportion and minor details of construction, may be resorted to without departing from the spirit or sacrificing any of the advantages of the invention.

By the term "non-rotatable" as applied to the knife or cutter I wish it understood as applying to a blade or cutter which is secured rigidly to a suitable support or operating means, and in one instance revolves with its supporting means and in the other modification is held from rotary movement but is given a movement inwardly and outwardly through the solder tube.

By arranging the solder tube in a vertical position, clearance of the severed ring from the operating zone or path of the knife does not have to be considered as a factor in limiting the speed of the machine, and advantage is taken of the force of gravity to place the ring without any handling directly into co-action with the die mechanism designed to receive and apply it to the can cap.

By the term "relative rotation" in the claims I mean to express the fact that either the tube may rotate, or the knife may, through its supporting means, revolve around the tube.

Having thus fully described my invention, what I claim as new, and desire to secure by Letters Patent, is:—

1. In a machine of the character set forth, the combination with means for supporting a tube of solder, means for continuously rotating the supporting means, a non-rotatable knife for cutting thin uniform endless rings from the end of the said solder tube at right angles to the axis thereof, means for moving the said knife into and out of coaction with the solder tube to cut the said rings, and means for feeding the solder tube at intervals, said feeding means being actuated by the means that moves the knife.

2. In a machine of the character described, the combination with means for supporting a tube of solder in a vertical position, said supporting means engaging only the exterior of the tube above its lower end, thereby leaving said lower end unsupported and the interior of the tube free, of a solder cutting knife movable in one direction into engagement with the unsupported lower end of the tube to cut rings therefrom, and movable in a reverse direction through the same path of travel to free itself from the tube, means for effecting a relative rotation between the knife and tube, and means for periodically lowering the tube when the knife is out of cutting engagement therewith and holding it against such movement when the knife is in engagement with the tube.

3. In a machine of the character described, the combination with means for supporting a tube of solder in a vertical position, of a movable conveyer located beneath the same and having an open seat in its upper side and movable to a position to bring said seat beneath but spaced from the tube, and means operating between the supporting means and conveyer for successively cutting off rings from the end of the tube when the seat is in said position, the rings dropping by gravity into the seat.

4. In a machine of the character described, the combination with means for supporting a tube of solder in a vertical position, of a rotatable conveyer located therebeneath and having a plurality of open seats in its upper side that are successively movable to positions to bring said seats beneath but spaced from the tube, and means for automatically slicing thin rings transversely from the end of the tube when the seats are in said position and causing the rings to drop by gravity into the seats.

5. In a machine of the character described, the combination with means for applying solder rings to the edges of can caps, said means including a movable conveyer having a female die to receive the can caps, of means for supporting a tube of solder in a vertical position above the conveyer and spaced from the same, means for moving the conveyer, and automatic means for slicing a thin endless ring of solder from the tube and causing it to drop by gravity to the female die.

6. In a machine of the character described the combination with means for applying solder rings to the edges of can caps, said means including a reciprocatory male die, and a rotatable table having a plurality of female dies into and out of which the male die moves, said female dies receiving the can caps, of means for supporting a tube of solder in a vertical position above the path of movement of the female dies, means operating between the support and table for cutting a thin, endless ring of solder from the lower end of the tube when a female die is therebeneath and causing the ring to drop by gravity to the female die, and means for rotating the table.

7. In a machine of the character described the combination with means for applying solder rings to the edges of can caps, said means including a rotatable table having a plurality of recessed seats in its upper side to receive the caps, and die mechanism movable into and out of the seats, of means for supporting a tube of solder in a vertical position above the table in line with the path of movement described by the seats, means for effecting a step-by-step rotation of the table to successively position the seats beneath the tube and the die mechanism, means for effecting a downward movement of the tube during the movement of the table, a knife movable into and out of coaction with the lower end of the tube, and means for effecting a relative rotary movement between the knife and tube to sever a ring from the latter and cause it to drop by gravity into the seat therebeneath.

8. In a machine of the character described the combination with means for holding a tube of solder, of a cutter, mechanism for effecting a relative rotation of the tube and cutter, means for moving the cutter into and out of coaction with the tube, said means including a device movable in opposite directions, and means operated by said device for feeding the tube longitudinally.

9. In a machine of the character described, the combination with means for holding a tube of solder, of a cutter, mechanism for effecting the relative rotation of the tube and cutter, means for moving the cutter into and out of coaction with the tube, said means including an actuating lever, and means operated by said lever for intermittently feeding the tube longitudinally.

10. In a machine of the character described, the combination with means for holding a tube of solder, of a cutter movable into and out of coaction with said tube, mechanism for effecting a relative rotation of the tube and cutter, means for intermittently feeding the tube longitudinally including a shaft having a ratchet wheel and a link having a dog that coöperates with the ratchet wheel, and means for moving the cutter into and out of coaction with the tube, said means being connected to and operated by the link.

11. In a machine of the character described, the combination with means for holding a tube of solder, of a cutter movable into and out of coaction with the tube, mechanism for effecting the relative rotation of the tube and cutter, means for moving the tube longitudinally, said means including a shaft having a ratchet wheel, a driving shaft having an eccentric, a lever operated by the eccentric, a link connected to the lever and having a dog that operates on the ratchet wheel, a swinging support for the knife, and connections between said support and the link which operates the dog, for effecting the movement of said knife.

12. In a machine of the character described, the combination with a supporting frame, of a rotary table mounted thereon and having a plurality of female dies in its upper side, of means for applying solder rings to the edges of can caps, said means including die mechanism movable into and out of the female dies, a shaft for operating said die mechanism, means for supporting a tube of solder in a vertical position over the table at one side of the die mechanism, means for effecting a downward movement of the tube of solder, said means including a vertical shaft having a ratchet wheel, an eccentric carried by the driving shaft, a lever operated by the eccentric, and a dog operating on the ratchet wheel and having connections with the lever, a knife movable into and out of coaction with the lower end of the tube to cut rings therefrom and drop the same into the female dies, a swinging support for the knife operated by the connections between the dog and the lever, means for effecting a relative rotation between the knife and tube, and means for effecting a step by step rotation of the table.

13. In a machine of the character set forth, the combination with means for supporting a tube of solder, means for continuously rotating the supporting means, a non-revoluble knife for cutting thin uniform endless rings from the end of the said solder tube at right angles to the axis thereof, means for moving the said knife into and out of coaction with the solder tube to cut the said rings, and means for feeding the solder tube at intervals, said feeding means being actuated by the means that moves the knife and taking place during a part only of the movement of the knife.

14. In a machine of the character set forth, the combination with means for holding a tube of solder in a vertical position with its lower end free and unsupported, a non-rotatable knife for cutting thin uniform endless rings from the said solder tube, said knife operating in a plane beyond where the tube is supported, means for supporting the knife at one side of the solder holding means and closely adjacent thereto, and means for effecting a relative rotation between the knife and tube.

15. In a machine of the character described, the combination with a vertically disposed rotatable and longitudinally movable shaft having a solder-tube holding chuck at its lower end, of means for rotating the shaft, a screw shaft located at one side of said shaft, an arm having a threaded engagement with the screw shaft and engaged with the first mentioned shaft, a ratchet wheel carried by the screw shaft, a swinging knife movable into and out of coaction with a tube carried by the first mentioned shaft, a lever having a link connection with the knife, and a dog mounted on the link connection and coacting with the ratchet wheel.

16. In a machine of the character described, the combination with a suitable supporting frame, of a rotatable table mounted thereon and having a plurality of recessed seats in its upper side, die mechanism movable into and out of the seats, a driving shaft connected to the die mechanism for reciprocating the same, a vertically disposed solder-tube holding shaft located at one side of the die mechanism over the path of movement of the seats, means for rotating the shaft and permitting its longitudinal movement, a swinging knife movable into and out of coaction with a tube secured to the shaft, an eccentric on the driving shaft, a lever operated by the eccentric, a link connecting the lever and the knife, a vertically disposed screw shaft arranged at one side of the tube holding shaft and having a ratchet wheel at its lower end, a dog mounted on the link and engaging the ratchet wheel, a divided nut engaging the screw shaft and having an arm in which the tube holding shaft is journaled, a dog operating on the table for effecting its step by step movement, and means operated by the driving shaft for effecting the movement of the dog.

17. In a machine of the character set forth, the combination with means for supporting a tube of solder with one end thereof free and unsupported, of a non-rotatable shearing knife movable into and out of coaction with the unsupported end of the tube, said knife being so connected to the solder support as to have a relatively rigid longitudinal relation thereto whereby the same distance is kept between the solder support and the knife at all times, and means for effecting the relative rotation of the knife and tube at a high rate of speed about an axis to which the tube is substantially concentrically disposed.

18. In a machine of the character set forth, the combination with means for supporting a tube of solder with one end thereof free and unsupported, of a shearing knife movable into and out of coaction with the unsupported end of the tube, means for holding the knife against rotation but moving it radially inward and outward with relation to the tube through the same path of travel, and means for rotating the tube at a high rate of speed.

19. In a machine of the character set forth, the combination with a rotatable conveyer, of die mechanism associated therewith, means carried by the conveyer for holding can caps, means for holding a tube of solder over the conveyer in a vertical position in line with the path of movement of the can cap holding means, said can cap holding means being movable into and out of coaction with the die mechanism and said tube holding means being disposed alongside the die mechanism, means for cutting thin, endless rings of solder from the tube and permitting them to drop by gravity directly into the can cap holding means, and means for rotating the conveyer to carry the can cap holding means from the solder tube to the die mechanism.

20. In a machine of the character set forth, the combination with a conveyer, of means for supporting a tube of solder in a vertical position above and feeding it toward the conveyer, mechanism for cutting thin, endless rings of solder from the lower end of said tube, and means for effecting a relative rotation between the knife and tube, the cutting mechanism after operating upon the tube allowing the rings to drop by gravity to the conveyer.

21. In a machine of the character set forth, the combination with means for supporting a tube of solder, and means for continuously rotating said tube, of a non-rotatable knife for slicing thin endless rings of solder from the end of the tube and supported in a fixed longitudinal relation with the tube supporting means, said knife having a movement into and out of coaction with the tube and having the face that is opposed to the end of the tube and in rear of the cutting edge arranged not closer to said end of the tube than the path of movement of the cutting edge, and means for automatically operating the knife and moving the tube longitudinally when the knife is out of engagement therewith.

22. In a machine of the character set forth, the combination with means for supporting a tube of solder, and means for rotating the tube, of a non-rotatable knife for slicing thin endless rings of solder from the end of the tube held by said means, said knife being supported in a fixed longitudinal relation with the tube supporting means, and being automatically movable into and out of engagement with the tube, the knife having one side only beveled to the cutting edge, the inner body of the knife in rear of the cutting edge being arranged not closer to the end of the tube than the path of movement of the cutting edge, the beveled side of the knife operating against the ring being cut.

23. In a machine of the character set forth, the combination with means for supporting a tube of solder and feeding the tube longitudinally of its axis through the means, of a non-rotatable knife for slicing thin endless rings of solder from the end of the tube held by said means, a means for supporting the knife, said means having a rigid connection to the solder tube support which preserves a rigid longitudinal relation between the solder support and the knife support, means for effecting the relative rotation of the tube and knife at a high rate of speed, and means for causing the knife to engage with the solder tube to slice a thin endless ring therefrom.

24. In a machine of the character set forth, the combination with means for supporting a tube of solder, of a non-rotatable knife for slicing thin endless rings of solder from the end of the tube, means for supporting the knife in rigid longitudinal relation to the solder supporting means, means for relatively rotating the knife and tube at a high rate of speed around a common center, and means for moving the blade of the knife radially inward a distance equal to the thickness of the solder tube during several of said rotations to sever a solder ring and for withdrawing the knife through the same path of movement to disengage it from the tube after a ring has been severed.

25. In mechanism for cutting thin endless rings, the combination with means for holding a tube of solder, a cutting member, and mechanism for relatively rotating said cutting member and solder tube, of mechanism for moving said cutting member radially inwardly through the solder tube during several rotations to sever a ring therefrom, the movement of the cutting member being constant and unyielding, and mechanism for automatically withdrawing said cutting member from the solder tube when said ring is severed, through the same path of movement, to wholly disengage the cutting member from the solder tube.

26. In a machine of the character set forth, the combination with means for supporting a tube of solder, means for rotating the same, a knife for cutting thin endless rings from the end of said tube, and means for holding the knife relatively stationary but permitting its movement inwardly into and out of coaction with the tube.

In testimony, that I claim the foregoing as my own, I have hereto affixed my signature in the presence of two witnesses.

WALTER J. PHELPS.

Witnesses:
  JOHN H. SIGGERS,
  B. G. FOSTER.

---

Copies of this patent may be obtained for five cents each, by addressing the "Commissioner of Patents, Washington, D. C."